United States Patent [19]

Noguchi et al.

[11] 3,978,836

[45] Sept. 7, 1976

[54] SUCTION HEAT CONTROL UNIT IN INTERNAL COMBUSTION ENGINE

[75] Inventors: Masaaki Noguchi, Nagoya; Masaharu Sumiyoshi, Toyota, both of Japan

[73] Assignee: Toyota Jidosha Kogyo Kabushiki Kaisha, Toyota, Japan

[22] Filed: Sept. 24, 1974

[21] Appl. No.: 508,821

[30] Foreign Application Priority Data
Oct. 9, 1973    Japan.............................. 48-113549

[52] U.S. Cl......................... 123/122 G; 123/179 H; 261/105
[51] Int. Cl.²................... F02M 31/00; F02M 31/16
[58] Field of Search............ 123/122 G, 133, 179 G, 123/179 H; 261/105

[56] References Cited
UNITED STATES PATENTS

| | | | |
|---|---|---|---|
| 1,408,277 | 2/1922 | Ensign | 123/122 G |
| 1,602,737 | 10/1926 | Woolson | 123/122 G |
| 1,657,293 | 1/1928 | Woolson | 123/122 G |
| 1,711,938 | 5/1929 | Good | 123/122 G |
| 2,803,295 | 8/1957 | Ambrose | 123/122 G |

FOREIGN PATENTS OR APPLICATIONS

| | | | |
|---|---|---|---|
| 279,834 | 2/1929 | United Kingdom | 123/122 G |
| 18,448 | 8/1914 | United Kingdom | 123/122 G |

*Primary Examiner*—Ronald H. Lazarus
*Attorney, Agent, or Firm*—Stevens, Davis, Miller & Mosher

[57] ABSTRACT

A mixture heating unit for internal combustion engines in which the heater body having a wick wetted by fuel is provided in the intake manifold and the mixture of fuel evaporated from said wick and air supplied thereto is heated and ignited by an ignition device, such mixture being further expedited in its combustion by a catalyst layer, with the resultantly produced combustible gas being introduced into the intake manifold.

12 Claims, 3 Drawing Figures

3,978,836

SUCTION HEAT CONTROL UNIT IN INTERNAL COMBUSTION ENGINE

BACKGROUND OF THE INVENTION

1. Field of the Invention

This invention relates to a mixture heating unit for internal combustion engines, and more particularly to such evaporator in which a heating source is provided in the intake manifold and also a catalyst is utilized for markedly improving the heating effect.

2. Description of the Prior Art

In the conventional mixture heating units of the type contemplated, there is used a system in which a part of the intake manifold provided downstream of the carburetor is heated by exhaust gas or hot water (with the intake manifold having a hot water riser), but such indirect mixture evaporating method is incapable of providing sufficient heating at the time of engine start. Such method is also problematic from the viewpoint of purification of exhaust gas which has become an important problem confronting the industries concerned of late. That is, atomization and vaporization of fuel becomes imperfect due to insufficient heating from the very moment of engine start, and this causes a non-uniform mixture of fuel and air, resulting in improper fuel distribution into the combustion chamber in each cylinder, deficient output of the internal combustion engine, and non-smooth run of the engine. For eliminating these defects, it is required to supply an overrich mixture. Such non-uniformity or improper distribution of the mixture induces excess fuel supply and improper or imperfect combustion, resulting in increased discharge of unburned harmful gases such as CO and HC. For removing such problems, it is necessary to provide means that can ensure sufficient heating even at the time of starting and warm-up running of the internal combustion engine.

SUMMARY OF THE INVENTION

In view of the above, the present invention provides an improved mixture heating unit for internal combustion engines whereby immediate and sufficient suction air heating is effected at the start of operation of the engine so as to expedite atomization and vaporization of fuel to improve uniformity of the induced mixture and fuel distribution into the respective cylinders and to also greatly improve the combustion to minimize emission of unburned harmful gases such as CO and HC while at the same time controlling the maximum combustion temperature to arrest generation of nitrogen oxide. The present invention features provision of a heating element at a suitable location in the intake manifold disposed downstream of the carburetor. In said heating element, fuel supplied from the carburetor wets the wick made of, for example, a porous material, while a part of air is introduced from the air cleaner, and the mixture of such fuel and air is ignited by a glow plug or spark plug provided in said heating element. This combustion flame ignites and activates the downstream catalyst layer to perfectly burn the mixture passing through said layer, while heat produced during this time in the form of burnt gas heats the heat riser part. The burnt gas that has undergone heat exchange flows into the intake manifold to heat the main mixture introduced from the carburetor.

DESCRIPTION OF THE PREFERRED EMBODIMENT

Figure 1:
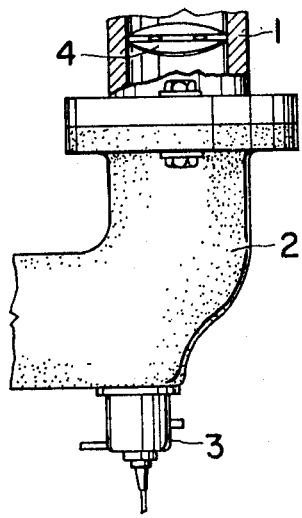
FIG. 1 is a diagrammatic drawing of a part of an intake manifold adapted with a mixture heating unit according to the present invention.
Figure 3:
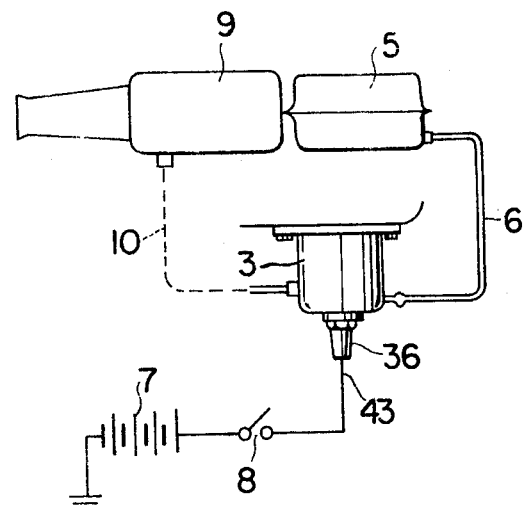
FIG. 3 is a system diagram of the mixture heating unit according to the present invention.

The present invention is now described in detail by way of an embodiment thereof with reference to the accompanying drawings.

It will be seen that an intake manifold 2 is connected to the carburetor cylinder 1 and a mixture heating unit 3 is attached to said intake manifold 2. Although the mixture heating unit 3 may be disposed at any position on the intake manifold 2, it is preferable to provide it at a location immediately below the carburetor so as to heat the heat riser part where fuel is accumulated in liquid form. In the carburetor cylinder 1 is provided a throttle valve 4 adapted to control the suction rate. Fuel is supplied into the mixture heating unit 3 through a fuel pipe 6 connected to a float chamber 5 in the carburetor, while air is supplied through an air pipe 10 connected to an air cleaner 9. The glow plug 36 is connected to a power source 7 through a cord 43 which is provided halfway in its length with a switch 8 designed either to double as the engine starting switch or to be operated responsive to the starting switch. Thus, the switch 8 may be arranged such that it will be turned ON with start of the internal combustion engine and kept ON throughout running of the engine or turned OFF with the lapse of a certain given period of time by means of a timer.

Figure 2:
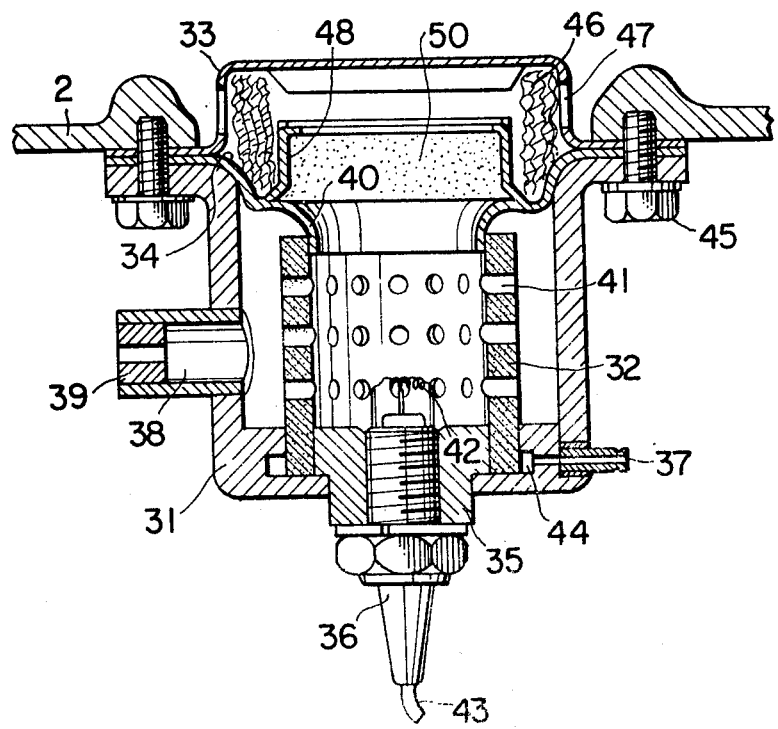
FIG. 2 is a detailed sectional view of the mixture heating unit according to the present invention.

A detail plan of the mixture heating unit 3 is given in FIG. 2. The body portion 31 of the unit is generally cylindrical in shape and is secured to the intake manifold wall by bolts 45. The body portion 31 is opened at its one end into the intake manifold and is provided at its other end with a hole which accommodates fitting of the glow plug 36 and in which an adapter 35 is joined by welding, with the spark plug 36 being threadedly fitted in the adapter 35. At the other end of the body portion 31 a guide channel 44 is provided which extends circumferentially around the body portion. Provided in communication with said channel 44 is a fuel supply port 37 which connects into the float chamber 5 through the fuel pipe 6. Also provided in the side wall of the body portion 31 is an air supply port 38 which is connected to the air cleaner 9 through an air pipe 10. Provided upstream of said air supply port 38 is an orifice 39 adapted to control the air flow rate. This orifice 39 is suitably determined in the stage of designed according to the specification and purpose of use of the internal combustion engine. In the inside of the portion 31 is provided a cylindrical wick 32 made of a porous material such as sintered metal. Said wick 32 is provided with several air holes 41. On the open side of the body portion 31 is mounted a heat riser frame 33 in a manner as if a cockpot is placed on a small kitchen range. The heat riser frame 33 is heated by still high temperature burnt gas in the mixture heating unit 3 and is also designed to serve for guiding the heat exchanged burnt gas in a desired direction in the intake manifold 2. In the side of the frame 33 are provided several burnt gas discharge ports 47 through which burnt gas is guided into the intake manifold 2 in a manner described later. In the inside of the frame 33 is provided a catalyst holding frame 48 which contains a catalyst 50, such as platinum, for effecting stabilized heat generation in the unit 3. This catalyst 50 may be of any desired configuration. For example, it may be carried by a pellet carrier or by a honeycomb structure or a wire gauze. Of course, the shape of the catalyst supporting frame 48 is suitably changed in conformity to the configuration of the catalyst 50. Between the catalyst supporting frame 48 and the wick 32 is disposed a shroud 40 which is designed to serve both as a guide for burnt gas in mixture heating unit 3 and as a support of the wick 32. Disposed between the frame 33 and the catalyst holding frame 48 is a cylindrical multilayer wire net 46 whereby should any flame be left in the combustion gas after the heat exchange, such flame is stifled by the net 46 so that it won't be admitted into the intake manifold 2 to ignite the mixture flowing therethrough.

The present mixture heating unit which has the above-described construction operates as follows. When the internal combustion engine starting motor is switched ON, the switch 8 is simultaneously turned ON, whereupon the hot wire 42 of the glow plug 36 is heated to release heat sufficient to fire. Also, with start of the engine starting motor, a negative pressure develops simultaneously in the inside of the intake manifold 2, allowing fuel and air to flow into the intake manifold 2 through the throttle valve 4 in the carburetor cylinder 1. On the other hand, the negative pressure in the intake manifold 2 naturally acts to the inside of the mixture heating unit 3 to vaporize fuel which has been already impregnated in the wick 32. Fuel in the float chamber 5, thus vaporized, is sucked into the wick 32 through the fuel pipe 6. The negative pressure in the mixture heating unit 3 also acts to the air supply port 38 to allow suction of air of the amount controlled by said negative pressure and the orifice 39, and such air is introduced into the inside of the wick 32 through air holes 41. This air, when passing through the air holes 41, promotes vaporization of fuel impregnated in the wick 32. In this way, the flow rates of fuel and air introduced into the mixture heating unit 3 are determined by the negative pressure in the intake manifold 2 and flow resistance in the respective supply passages. The amount of main fuel-air mixture, which is taken into the intake manifold 2 while controlled by the throttle valve 4, is also determined by said negative pressure in the intake manifold and resistance in the passage. Thus, the mixture heating unit aimed at in the present invention can be accomplished by suitably selecting the size of the orifice 39 and suitably designing the fuel supply port 37 while taking into consideration the running conditions such as starting and the loaded region. For instance, the mixture heating unit can be effected such that the air-fuel ratio of the mixture taken into the unit 3 will be about 20 and that the amount of burnt gas produced will be approximately 5% of the amount of the main mixture supplied into the intake manifold through the throttle valve 4. It is to be noted that the maximum combustion temperature in the engine combustion chamber must be lowered to some extent for reducing the content of nitrogen oxides in exhaust gas, and this condition must be also taken into account in setting the mixture supply rate. Fuel vaporized in the inside of the wick and air flowing in from the air holes 41 are mixed up and this mixture is easily ignited by the already heated hot wire 42 of the glow plug 36, with the resultantly produced burnt gas flowing into the catalyst 50 through the shroud 40. At this time, the wick 32 is heated by burnt gas, and hence fuel impregnated in said wick 32 is also heated and readily vaporized while passing through the wick to further expedite and stabilize burning in the mixture heating unit. Therefore, there is no need of constantly feeding current to the wire 42 of the glow plug 36, and it is possible to employ a system in which power is connected to the wire only starting the engine. This burnt gas, upon touching the catalyst 50, heats the catalyst to activate its catalytic action so that, even if a part of the in-flowing burnt gas is in the unburned state and burning is unstabilized by variation of the air-fuel ratio of the mixture flowing into the unit and other factors, the unburned portion of the entering gas is burned perfectly with the aid of the activated catalyst. The burned gas then flows into the frame 33 to undergo heat exchange therein, then passes the wire net 36 and enters the intake manifold 2 through the discharge ports 47. Since the burned gas which has entered the intake manifold 2 still maintains certain calorific power even after undergoing heat exchange with the heat riser frame 33, it heats the main mixture when it is mixed with said mixture which has been introduced through the throttle valve 4. In this way, the main mixture is quickly heated from the start of the engine operation by heating of the heat riser frame 33 and by the action of burned gas supplied from the mixture heating unit 3, so that fuel in the main mixture is easily atomized and vaporized while forming a uniform mixture. Consequently, mixture distribution into the respective cylinders is made uniform, allowing continuation of steady operation even if the air-fuel ratio is set leaner on the average.

As viewed above, the mixture heating unit 3 according to the present invention sufficiently heats the main mixture by producing burned gas from the moment of motoring before vehicle start, so as to expedite vaporization of fuel while markedly improving fuel distribution into the respective cylinders and combustion therein. There is therefore no need of supplying an overrich mixture. This results in not only a better combustion state but also markedly reduced yield of unburned gases as CO and HC gases since no extra fuel supply is needed.

Nitrogen oxides are likely to be produced under the conditions of high temperature, high pressure and presence of excess oxygen, and it is well known that if the mixture is lean in lightload running for preventing generation of unburned gases such as CO and HC, there results an increased yield of NOx in certain ranges. For eliminating NOx in exhaust gas, it is necessary to induce a reduction reaction, but there is known no easily practiceable means for effectuating such reduction reaction except for using a reducing catalyst. However, according to the mixture heating unit of the present invention, since burned gas is introduced into the intake manifold, there is actually obtained the same result as when non-heat-generating material (inert gas) is introduced into the combustion chamber, and hence the maximum combustion temperature can be lowered to reduce generation of NOx.

Further, in the present invention, since a wick made of a porous material is used as fuel supply means in the unit, distribution and vaporization of fuel are accomplished very smoothly and quickly and the once ignited mixture forms an extremely stabilized burned flame, so that there is no need of providing a specific flame holding mechanism. Such stabilized burned gas supply system proves extremely useful in internal combustion engines for automobiles where the operating conditions vary frequently.

Further, the unit of the present invention can be adapted with ease to any type of internal combustion engine by merely forming a mounting opening in the intake manifold 2. Also, since negative pressure in the intake manifold is utilized as means for feeding fuel and air into the unit, there is no necessity of mounting any complicated pump or the like, and accordingly, both assemblage and maintenance are easy.

As described in detail above, the present invention provides an improved mixture heating unit for use in an internal combustion engine characterized in that both fuel and air are sucked in by utilizing negative pressure in the intake manifold, and particularly, fuel is vaporized by passing it through a porous material, and then the mixture is ignited and burned, with the resultantly produced burned gas being burned perfectly through contact with a catalyst and then introduced into the intake manifold to thereby sufficiently heat the main mixture. The construction and combination of parts, however, are not limited to those described hereabove in connection with a preferred embodiment but may be embodied in various other ways within the scope of the invention. For instance, a spark plug may be substituted for the glow plug used as the igniting device in the mixture heating unit. Also, the intake manifold may be combined with other heat control devices such as a hot water riser.

What we claim is:

1. A suction system for an internal combustion engine, said system comprising:
   a carburetor for producing a fuel-air mixture;
   a suction pipe, through which the mixture is supplied to the engine, in fluid communication with said carburetor;
   a fuel supply source other than the suction pipe;
   an air supply source other than the suction pipe;
   a suction heat control unit mounted on said pipe downstream of the carburetor, said heat control unit comprising:
     a housing attached to the suction pipe, said housing having an opening defined therein which opens into the suction pipe;
     a porous body for retaining fuel therein, said body being within said housing and being impregnated with fuel;
     a fuel supply pipe through which fuel is supplied to said porous body; one end of said fuel supply pipe being connected to said housing and the other end thereof being connected to said fuel supply source;
     an air supply pipe through which air is supplied to said housing; one end of said air supply pipe being connected to said housing and the other end thereof being directly connected to said air supply source; and
     an ignition means for igniting the mixture of fuel evaporated from said body and air supplied through said air supply pipe.

2. A suction system as claimed in claim 1, wherein said heat control unit further comprises a catalyst means adjacent to the opening of said housing, and the burned gas passes through said catalyst means.

3. A suction system as claimed in claim 1, wherein said ignition means comprises a glow plug energizable in response to the switching on of a starting switch of an engine.

4. A suction system as claimed in claim 1, wherein said fuel supply source comprises a float chamber of the carburetor.

5. A suction system as claimed in claim 1 wherein said air supply source comprises an air cleaner.

6. A suction system as claimed in claim 1, wherein said porous body has the shape of a cylinder and is arranged concentrically in said housing, and said cylinder has holes therein for allowing air to pass therethrough.

7. A suction system as claimed in claim 6, wherein said ignition means extends into the cylinder of said porous body.

8. A suction system as claimed in claim 2, wherein said control unit further comprises a guide means for conducting the burned gas in the porous body to said catalyst means.

9. A suction system as claimed in claim 1, wherein said control unit further comprises means, at the opening of said housing, for preventing the flame of the burned gas from flowing into said suction pipe.

10. A suction system as claimed in claim 1, wherein said control unit further comprises a perforated cover member covering the opening of said housing.

11. A suction system for an internal combustion engine, said system comprising:
    a carburetor for producing a fuel-air mixture;
    a suction pipe, through which the mixture is supplied to the engine, in fluid communication with said carburetor; and
    a suction heat control unit mounted on said pipe downstream of the carburetor, said heat control unit comprising:
      a cylindrical housing attached at one end thereof to the suction pipe, said housing having an opening at said one end which opens into the suction pipe;
      a cylindrical wick coaxially disposed within said housing for retaining fuel therein, said wick being impregnated with fuel;
      a fuel supply pipe through which fuel is supplied to said housing;
      an air supply pipe through which air is supplied to said housing; and
      a glow plug for igniting the mixture of fuel evaporated from said wick and air supplied through said air supply pipe, said plug being disposed coaxially with respect to said housing and extending within said wick from the other end of said housing.

12. A suction system for an internal combustion engine, said system comprising:
    an air cleaner;
    a carburetor for producing a fuel-air mixture, said carburetor having a float chamber;
    a suction pipe in fluid communication with said carburetor; and
    a suction heat control unit mounted on said pipe downstream of the carburetor, said heat control unit comprising:
      a housing attached to said suction pipe, said housing having an opening defined therein which opens into the suction pipe;

a porous body for retaining fuel therein, said porous body being within said housing and being impregnated with fuel;

a fuel supply pipe through which fuel is supplied to said porous body, one end of said fuel supply pipe being connected to said housing and the other end thereof being directly connected to said float chamber;

an air supply pipe through which air is supplied to said housing, one end of said air supply pipe being connected to said housing and the other end thereof being directly connected to said air cleaner; and an ignition means for igniting the mixture of fuel evaporated from said body and air supplied through said air supply pipe.

* * * * *